Nov. 5, 1940.                    J. W. LEE                    2,220,416
                                PAN LIFTER
                           Filed Aug. 15, 1939
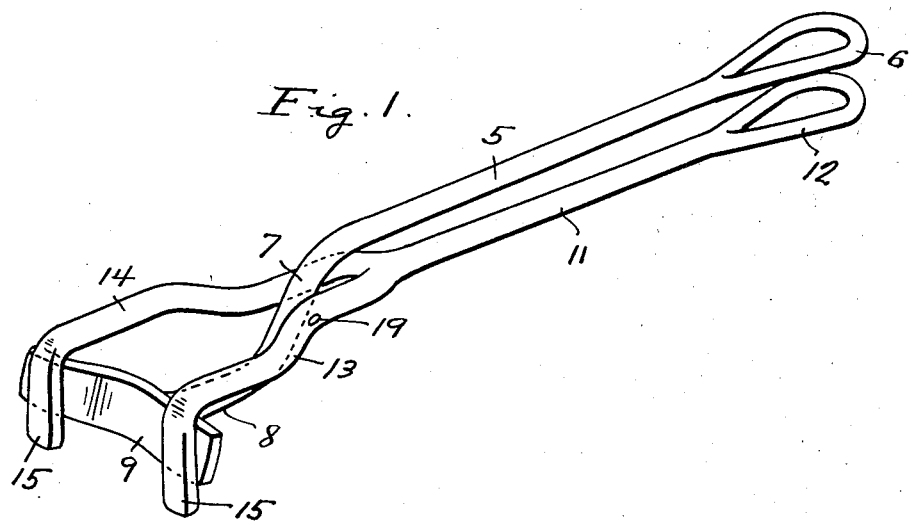
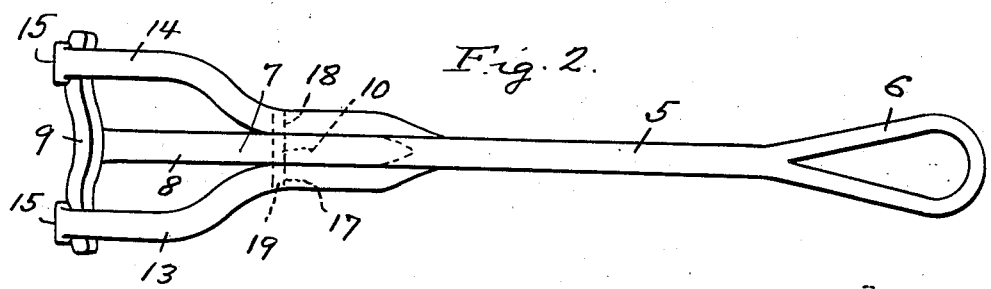
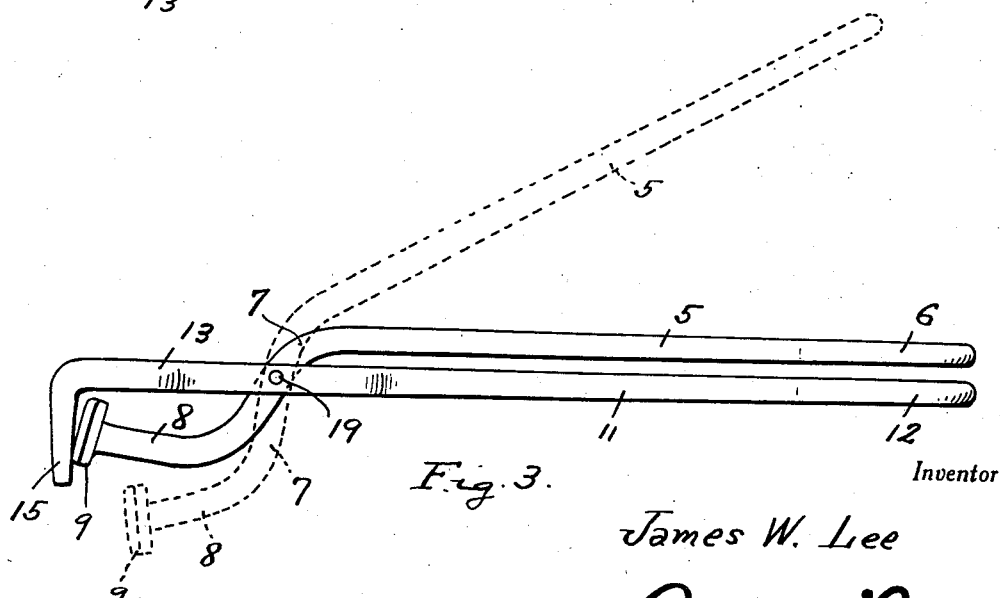
Inventor
James W. Lee
By Clarence A. O'Brien
and Hyman Berman
Attorneys Patented Nov. 5, 1940

2,220,416

UNITED STATES PATENT OFFICE 2,220,416

PAN LIFTER

James W. Lee, Mexico, Mo.

Application August 15, 1939, Serial No. 290,288

1 Claim. (Cl. 294—31)

The present invention relates to new and useful improvements in pan lifters and has for its primary object to provide, in a manner as hereinafter set forth, a device of this character embodying a novel construction, combination and arrangement of parts through the medium of which a hot pan may be lifted and moved with a minimum of danger of being injured.

Other objects of the invention are to provide a pan lifter of the forementioned character which will be comparatively simple in construction, strong, durable, highly efficient and reliable in use, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of my invention.

Figure 2 is a top plan view of the invention, and

Figure 3 is a side elevational view of the invention.

Referring now to the drawing in detail, it will be seen that the reference numeral 5 designates a handle of suitable material, such as metal, one end portion of which is formed into a loop to provide a hand hold 6. The other end portion of the handle 5 is bent into a gooseneck 7 from which extends an offset portion 8 which has formed integral therewith a substantially curved T-head jaw 9. The gooseneck portion 7 has an opening transversely therethrough as indicated by the numeral 10.

Another handle 11, of metal or other suitable material, has formed at one end portion thereof a looped hand hold 12, while its other end portion is formed to provide arms 13 and 14. The outer end portions of the arms 13 and 14 are bent downwardly, substantially at right angles to the arms 13 and 14, and are flattened to provide a jaw 15 for opposing the curved T-head jaw 9.

The arms 13 and 14 have openings 17 and 18 transversely therethrough for the reception of a pin 19 which also passes through the opening 10 to provide a pivotal connection for swinging the jaws 9 and 15 into open or closed position as shown in dotted lines of Fig. 3 of the drawing.

When the device is to be used the jaws 9 and 15 are swung into open position as shown in dotted lines in Figure 3 of the drawing. When in this position the open jaws may be placed over the top edge portion of a pan with the jaws 15 contacting the inside surface of the pan and the curved T-head jaw 9 contacting the outside surface of the pan. In this position the jaws 9 and 15 are forced together, to hold the pan, by closing the handles 5 and 11.

Although I have shown and described herein a preferred embodiment of my invention, it is to be definitely understood that I do not desire to limit the application of the invention thereto, and any change or changes may be made in the materials and in the structure and arrangement of the parts within the spirit of the invention as claimed.

What is claimed is:

In a device of the character described, a pan lifter comprising two members hinged together one of said members being substantially straight and provided with diverging portions at one end thereof, parallel arms extending from said diverging portions, depending right angular flared jaw members on said arms, an offset portion formed in the other of said members and mounted between said diverging portions, a pin extending through said offset portion and said diverging portions to hingedly secure the members together, an extension on said offset portion, a pair of arms extending laterally from the end of said extension, a jaw on each of said arms opposed to one of said flared jaw members, and handles on said members for closing and opening said jaws.

JAMES W. LEE.